Oct. 8, 1940.                J. H. BUSKIRK              2,216,834
                       CHEMICAL SPONGE RUBBER PROCESS
                            Filed Dec. 31, 1938
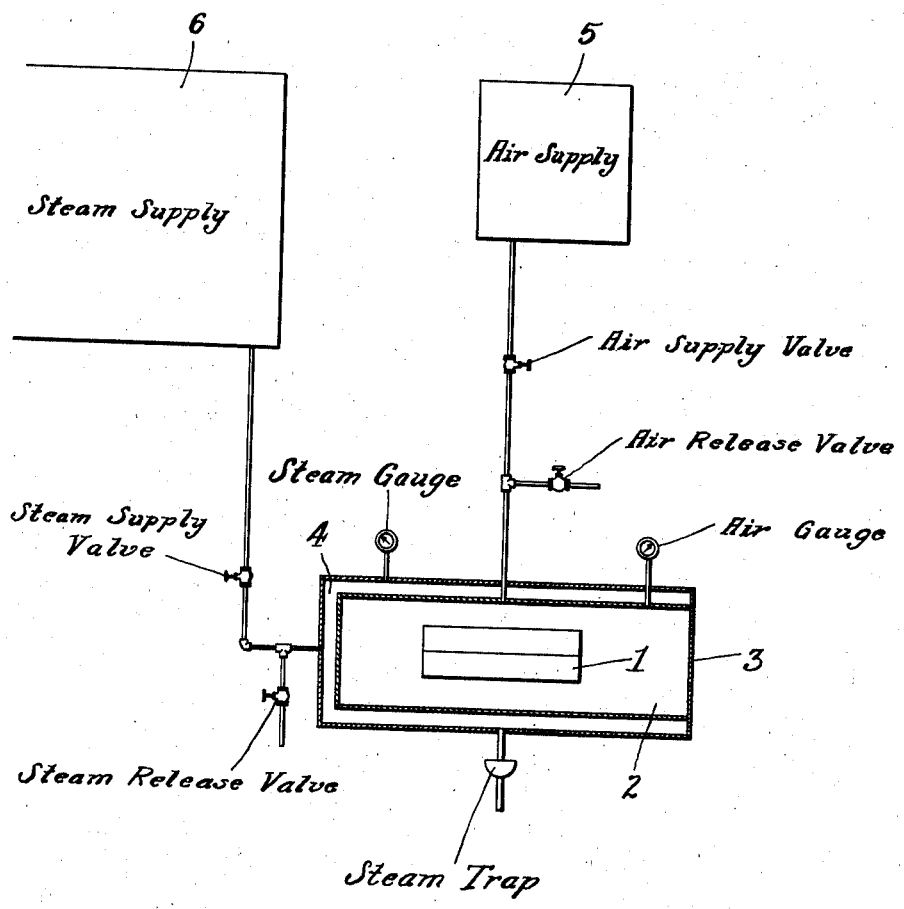
Inventor
Joseph H. Buskirk
By Bacon + Thomas
- Attorneys Patented Oct. 8, 1940

2,216,834

UNITED STATES PATENT OFFICE 2,216,834

CHEMICAL SPONGE RUBBER PROCESS

Joseph H. Buskirk, La Fayette, Ind., assignor to Brown Rubber Company, Inc., La Fayette, Ind., a corporation Application December 31, 1938, Serial No. 248,871

6 Claims. (Cl. 18—53)

This invention relates to a process of forming sponge rubber from so-called "chemical sponge" stock.

The chief object of this invention is to produce in a sponge rubber body, a cellular arrangement of improved character and in a relatively short time and having when desired, the cells elongated in the direction of expansion and from "chemical sponge" stock.

"Chemical sponge" stock is rubber stock having certain ingredients therein, normally non-reactive, but which react chemically to produce a so-called blowing agent in the rubber portion of the stock. In the usual practice the proper amount of such stock when placed in a mold fills the mold when the chemical reaction and curing is completed. Such molds are usually steam heated.

The resulting cell structure is what may be termed elongated and transverse to the mold or direction of stock enlargement. Such stock, if the "blow" portion thereof be increased, results in dissipation of the excess because the mold leaks.

Such blowing agents are carbon dioxide, nitrogen or some other relatively inert gaseous material. Chemical sponge stock usually includes carbon dioxide producing chemicals. It may include ammoniacal compounds.

So-called carbon dioxide or $CO_2$ sponge, is sponge rubber made from stock usually having little or no blowing agents therein but which is subjected to an atmosphere of carbon dioxide which it absorbs, and when stock is sufficiently impregnated therewith (usually applied thereto under pressure), the pressure is released to permit of stock expansion until the mold is filled and the expanded stock is then cured. It is obvious that the cycle time includes as an important and relatively large portion thereof the impregnation or penetration period.

It is equally obvious that chemical sponge requires but a slight gas generation time interval. $CO_2$ sponge has the advantage that it can be produced with substantially any size of cell structure because the stock expansion can be controlled. Representative of such practice is the disclosure in Patents No. 1,964,739; 1,964,740 and 2,109,676 to Henry D. Minor.

The time cycle of such processes as therein disclosed is approximately four hours, although for many products this is not unduly objectionable because heretofore the usual chemical sponge process could not produce such products. Furthermore, the cost of manufacturing such special products by reason of the high cost of carbon dioxide, and limited production due to excessive cycle interval has practically restricted the use of such processes to these special products only. However more desirable the $CO_2$ sponge may be over the standard chemical sponge, it has not displaced the latter in the major uses.

All of the aforesaid relative to the production of $CO_2$ sponge applies to nitrogen sponge.

Another form of sponge rubber which requires an even greater time cycle, and an even greater cost of production than that of nitrogen or $CO_2$ sponge is the liquid latex sponge produced, briefly, by heating and frothing liquid latex, adding a gel agent thereto to hold material in frothed condition, then supplying same to a mold and curing the frothed material therein.

The present invention produces sponge rubber at a cost approximately that of chemical sponge and well below all other sponge rubbers mentioned.

The present invention has a time cycle slightly greater than that usually required to produce standard chemical sponge and appreciably less and in many cases at least half that of the gas impregnation processes.

The present invention permits production of the desired cell size in the sponge stock, so to this extent it is equally as satisfactory as the gas impregnation processes mentioned and, of course, far superior to a like degree therewith relative to the standard chemical sponge process.

The present invention permits the production of elongated cells, the elongation being coincident to the direction of stock expansion as distinguished from standard chemical sponge wherein the elongation, if any, is transverse thereto.

For seat cushions, pads, upholstery units, arm rests, et cetera, the inherent limitations in the production of chemical sponge units results in products in which the resistance is directed oppositely to that desired, and the yield also is reversely directed.

The present invention products such units in which the resistance is properly directed and the yield is similarly directed.

Having thus briefly set forth the present known processes, and the characteristics, advantages and disadvantages thereof and resulting products and having briefly indicated the advantages of the present invention and products embodying same, reference now will be had to a specific disclosure of the process embodied in this invention.

Briefly stated, this process contemplates the use of chemical sponge stock, wherein the amount of blowing agent, or agents, however, is increased over the standard stock, usually being in the order of two to one, but not necessarily confined to such ratio.

This stock is placed in the mold which is of parted character and the parts are clamped together.

The mold is placed in a pressure chamber which is heated preferably externally as by steam jacketing. Compressed air is introduced into the chamber and, of course, penetrates the mold for these are not hermetically sealed.

The heat causes the desired chemical reaction to occur, and since the mold is subjected to pressure, the generated gas (carbon dioxide) fully permeates the rubber portion of the stock. Such generation and permeation is very rapid because the generating ingredients are uniformly distributed throughout the stock as is the common practice in producing the standard chemical sponge stock.

Due to the pressure applied to the mold and stock therein, this generated gas does not escape from the mold but must remain intimately associated with the rubber stock therein and is held in said stock in compressed relation until the pressure is released.

If the pressure be rapidly released, the expansion of the stock is rapid and the cells become elongated in the direction of stock expansion. If the pressure be slowly released, the cellular structure is more regular.

When the desired release of pressure, time and amount thereof being controlled as desired, has occurred, the stock has completely filled the mold, and then the cure is effected.

From the foregoing, therefore, it is possible to obtain from chemical sponge rubber stock, sponge rubber having all the desirable characteristics of sponge rubber produced by a gas impregnation process without, however, requiring impregnation of rubber stock with such gas, and the novel process requires but slightly greater operating time as compared to standard chemical sponge rubber production time, and about half that of the gas impregnation process, since the impregnation step is omitted. The invention requires over the usual chemical sponge rubber production costs, the relatively insignificant cost of the additional amount of "blowing" agent, and the cost of operating an air compressor, which may be motor driven or driven by a steam engine, since steam usually is available for curing purposes in a rubber plant. The pressure agent, compressed air, therefore, is relatively insignificant in cost as compared to the cost of carbon dioxide gas or nitrogen which usually are in compressed form but not necessarily so. If solidified, carbon dioxide—"dry ice"—is used, the cost is even greater because of sublimation loss incident to its transportation and storage. Such loss is approximately twenty five percent. For example, for every four pounds of dry ice required, five pounds must be purchased.

By way of illustration only, the following detailed description is given, although it is to be understood expressly that the basic invention as hereinbefore set forth, is not to be limited thereby.

The sponge stock includes milled rubber, vulcanizers, gas generators and accelerators, etc., that are well known in the industry. The blowing agent thereof is usually sodium bicarbonate which when heated forms or generates carbon dioxide. As previously stated, approximately twice the usual amount of blowing agent is incorporated in the sponge stock. Other blowing agents can be substituted or combined with the aforesaid as desired and as well known in the industry. Such an agent is ammonium carbonate. The stock includes an accelerator. In the present invention, the accelerator utilized is selected on the basis of the one which functions the best for the setting up or curing of the sponge. The accelerator preferably should not be very active during the gas generation period but should be suitably active during the curing period in order to hasten the cure and reduce the time cycle proportionately.

The mold and pressure chamber are usually heated. Upon reception of the stock by the mold, gas generation immediately ensues. However, usually upon closing and sealing of the chamber with the mold therein, air pressure is controllably supplied thereto. This prevents stock expansion in the mold, but does not prevent gas generation, same being under the pressure aforesaid. The air pressure in the chamber is built up as fast as possible, to say, 110 lbs. per square inch, so as to initially prevent stock expansion and insure stock permeation with the generated gas as it is generated. This pressure building interval may be about five minutes. The pressure and generating time may be that required—say fifteen minutes, and the temperature is that of the chamber jacket supplied with steam at 35 lbs. per square inch. A higher jacket temperature results in a faster gas generation although the permeation is not as perfect. Generation and permeation, therefore, may be said to be effected at a relatively low temperature.

Following approximately complete gas generation and permeation of the unexpanded stock, the chamber pressure is released. The rate of release determines the character of the cellular structure. If rapidly released, say from 110 lbs. per square inch to atmospheric pressure or thereabouts, in five minutes time, the cells will be quite elongated and such elongation is in the direction of the expansion. If the reduction is retarded to say 30 minutes, the cells will be quite small.

Subsequent to the pressure release or simultaneously therewith, the chamber jacket is supplied with steam, say at 60 lbs. per square inch although pressures from 40 to 100 lbs. per square inch have been employed. This constitutes the curing period which, depending upon the stock employed, may vary from approximately 30 minutes to an hour and a half. Curing is thus effected at a relatively high temperature and a low pressure.

The size, quality and cellular character of the piece desired to be formed, determine the initial stock employed, including the accelerators, curing agents, fillers and gas generators, the gas generating interval and temperature and pressures, the expansion interval, and the curing interval, pressure and temperature employed.

It is to be observed that steam is supplied to the chamber jacket at all times, although at different pressures, depending upon the temperatures desired. Pressure may be maintained on the mold in the chamber or not, as desired, and to the desired degree during the curing stage and, of course, may be varied during such stage. It may be also varied during the gas generating and permeation, or holding period and as desired.

Since from the foregoing description it will be obvious that apparatus necessary to practice the invention, may take many forms, a diagrammatic illustration of representative apparatus is included. Suffice to say, it essentially consists of a mold 1 of partable character to receive the sponge stock, a pressure chamber 2 to receive the mold and having a closure 3 for closing an opening through which access is had to the mold or the mold is supplied to and removed from the chamber, means for heating the chamber such as a steam jacket 4, means for supplying pressure to the chamber interior and for releasing the pressure therefrom, a source of heat 5 and a source of pressure 6 together with the necessary control valves, pressure gauges, thermometers (not shown) and timing apparatus (not shown). The interconnection thereof to automatically attain the desired cycle operations is a separate invention, since it is obvious that the apparatus thus briefly described, can be manually controlled and the subject matter of such automatically operable apparatus is reserved for subsequent application.

While the basic invention has been thus generically and specifically described herein and several ranges of operation as to time, pressures, temperatures, have been set forth, the same is to be considered illustrative and not restrictive to character. Various modifications thereof which will readily suggest themselves to persons skilled in this art, all are considered to be within the broad scope of the invention, reference being had to the appended claims.

The invention claimed is:

1. The process of making sponge rubber which comprises, providing a mass of sponge rubber stock having a gas generating material therein, subjecting said stock to heat sufficient to cause gas generation from said material but insufficient to effect vulcanization of said stock, and simultaneously with said gas generation subjecting said stock to an atmosphere of a relatively inert non-absorbable gaseous medium maintained under a pressure greater than that of the generated gas, to thereby prevent expansion of said stock while permitting the generated gas to completely permeate said stock; gradually reducing the pressure of said gaseous medium to substantially atmospheric pressure to permit controlled expansion of said gas permeated stock; and thereafter subjecting the expanded stock to relatively higher heat sufficient to completely vulcanize said stock.

2. The process of making spnoge rubber which comprises, providing a mass of sponge rubber stock having a gas generating material therein, subjecting said stock to a temperature sufficient to cause gas generation from said material but insufficient to effect vulcanization of said stock, and simultaneously with said gas generation subjecting said stock to an atmosphere of air maintained under a pressure greater than that of the generated gas, to thereby prevent expansion of said stock while at the same time permitting the generation of gas and complete permeation of said stock; reducing the pressure of said atmosphere at a predetermined rate to permit controlled expansion of said gas permeated stock to thus govern the cell size of said stock; and thereafter subjecting the expanded stock to a relatively higher temperature to vulcanize said stock.

3. The process of making sponge rubber which comprises, providing a mass of sponge rubber stock containing a gas generating agent substantially uniformly distributed therethrough; placing said stock in a mold and inserting said mold in a chamber; subjecting said stock to heat sufficient to cause said agent to generate gas but insufficient to effect vulcanization of said stock, continuing said heating for a time sufficient to substantially completely permeate said stock with said gas, and simultaneously with said heating and gas generation and permeation, rapidly building up in said chamber an atmosphere of a relatively inert non-absorbable gaseous medium under a pressure greater than that of said generated gas to maintain said stock under pressure and thereby prevent expansion of said stock in said mold during said gas generation and stock permeation; releasing said gaseous medium from said chamber at a given rate to control the expansion of said stock in said mold and thus govern the cell size of said stock; and then subjecting said expanded stock to relatively higher heat for a time period long enough to effect vulcanization of said stock.

4. The process of making sponge rubber which comprises, providing a mass of sponge rubber stock containing a gas generating agent substantially uniformly distributed therethrough; placing said stock in a closed chamber; subjecting said stock to heat sufficient to cause said agent to generate gas, continuing said heating for a time sufficient to substantially completely permeate said stock with said gas, and simultaneously with said heating and gas generation and permeation, rapidly introducing air into said chamber under a pressure greater than that of said generated gas to maintain said stock under pressure and thereby prevent expansion of said stock during said gas generation and stock permeation; releasing said air pressure from said chamber at a predetermined rate to control the expansion of said stock and thus govern the cell size of said stock; and thereafter subjecting said expanded stock to relatively higher heat for a time period long enough to effect vulcanization of said stock.

5. The process of making sponge rubber which comprises, providing a mass of sponge rubber stock containing a gas generating agent substantially uniformly distributed therethrough; placing said stock in a mold and inserting said mold in a heated chamber; subjecting said stock to the heat of steam at a pressure of about 35 lbs. per sq. in. to cause said material to generate gas, continuing said heating for a time sufficient to substantially completely permeate said stock with said gas, and simultaneously with said heating and gas generation and permeation rapidly building up in said chamber an air pressure of about 110 lbs. per sq. in. to maintain said stock under pressure and thereby prevent expansion of said stock in said mold during said gas generation and stock permeation; reducing said air pressure in said chamber at a predetermined rate to control expansion of said stock in said mold and thus govern the cell size of said stock; and then subjecting said expanded stock to the heat of steam at a pressure of about 60 lbs. per sq. in. for a time period sufficient to vulcanize said stock.

6. The process of making sponge rubber which comprises, providing a mass of sponge rubber stock containiing a gas generating material substantially uniformly distributed therethrough; placing said stock in a mold and inserting said mold in a chamber; subjecting said stock to the heat of steam under a pressure of about 35 lbs.

per sq. in. to cause said material to generate gas, continuing said heating for about 15 minutes to substantially completely permeate said stock with said gas, and simultaneously with said heating and gas generation and permeation, providing in said chamber an atmosphere of a relatively inert non-absorbable gaseous medium under a pressure of approximately 110 lbs. per sq. in. to maintain said stock under pressure and thereby prevent expansion of said stock in said mold during said gas generation and stock permeation, releasing said gaseous medium to reduce the pressure in said chamber to atmospheric in about 5 to 30 minutes to control the expansion of said stock in said mold at a desired rate and thus govern the cell size of said stock; and then subjecting said expanded stock to the heat of steam at a pressure of 40 to 100 lbs. per sq. in. for a period of 30 minutes to 1½ hours to effect vulcanization of said stock.

JOSEPH H. BUSKIRK.